(12) United States Patent
Matsumoto et al.

(10) Patent No.: US 7,731,289 B2
(45) Date of Patent: Jun. 8, 2010

(54) AUTOMOTIVE SEAT RECLINING DEVICE

(75) Inventors: Tadashi Matsumoto, Hamamatsu (JP);
Kunihisa Oishi, Kosai (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 12/370,357

(22) Filed: Feb. 12, 2009

(65) Prior Publication Data
US 2009/0224588 A1    Sep. 10, 2009

(30) Foreign Application Priority Data
Mar. 5, 2008    (JP)    ............... 2008-054204

(51) Int. Cl.
*B60N 2/22*    (2006.01)
*B60N 2/225*    (2006.01)
*A47C 1/025*    (2006.01)

(52) U.S. Cl. ...................................... 297/362; 297/374

(58) Field of Classification Search ................. 297/362, 297/374, 367, 376
See application file for complete search history.

(56) References Cited

U.S. PATENT DOCUMENTS

| 5,308,294 | A | * | 5/1994 | Wittig et al. | ................. | 475/162 |
| 5,634,380 | A | * | 6/1997 | Scholz et al. | ................. | 74/528 |
| 6,619,743 | B1 |   | 9/2003 | Scholz et al. |   |   |
| 6,755,470 | B2 |   | 6/2004 | Iwata et al. |   |   |
| 7,281,765 | B2 | * | 10/2007 | Scholz et al. | ................. | 297/362 |
| 7,384,101 | B2 | * | 6/2008 | Kawashima et al. | ........ | 297/362 |
| 7,513,572 | B2 | * | 4/2009 | Kawashima | ................. | 297/362 |
| 2004/0004384 | A1 | * | 1/2004 | Iwata et al. | ................. | 297/367 |
| 2006/0290187 | A1 | * | 12/2006 | Scholz et al. | ................. | 297/362 |

FOREIGN PATENT DOCUMENTS

| JP | 2003-507101 A | 2/2003 |
| JP | 2004-033401 A | 2/2004 |
| JP | 2006-094991 A | 4/2006 |

\* cited by examiner

*Primary Examiner*—Joseph F Edell
(74) *Attorney, Agent, or Firm*—Foley & Lardner LLP

(57) ABSTRACT

An automotive seat reclining device includes a first rotation member connected to one of a seat back and a seat cushion and having an internal gear and a bearing sleeve coaxial with the internal gear, a second rotation member connected to the other of the seat back and the seat cushion and having an external gear and a bearing bore coaxial with the external gear, a pair of wedge members disposed in a circular eccentric space between the bearing sleeve and the bearing bore and a drive member inserted in the eccentric space to move the mesh of the internal and external gears by pushing the wedge members and rotate the second rotation member relative to the first rotation member. Each of the wedge members has an inner circumferential surface formed with a recessed section and two contact sections for contact with an outer circumferential surface of the bearing sleeve.

3 Claims, 9 Drawing Sheets

PRIOR ART

AUTOMOTIVE SEAT RECLINING DEVICE

BACKGROUND OF THE INVENTION

The present invention relates to an automotive seat reclining device having a pair of wedge members to hold a seat back tightly at a desired angular position relative to a seat cushion without causing play in the seat back due to tilting of the wedge members.

Japanese Laid-Open Patent Publication No. 2004-33401 discloses an automotive seat reclining device that has a seat back angle adjustment mechanism equipped with a differential gear unit to pivot a seat back electrically at a high reduction gear ratio and thereby adjust the seat back to a desired angular position with respect to a seat cushion.

The differential gear unit generally includes a first rotation member (or bracket) coupled to either one of the seat cushion and the seat back and formed with an internal gear and a bearing sleeve, a second rotation member (or bracket) coupled to the other of the seat cushion and the seat back and formed with an external gear and a bearing bore, a pair of wedge members disposed within a circular eccentric space between an outer circumferential surface of the bearing sleeve and an inner circumferential surface of the bearing bore and biased away from each other by a spring and a drive member inserted in the eccentric space to move the mesh of the internal and external gears circumferentially together with the wedge members and thereby rotate the second rotation member relative to the first rotation member in a direction opposite to the rotation direction of the gear mesh. Each of the wedge members has an inner circumferential surface formed with a protrusion for sliding line contact with the outer circumferential surface of the bearing sleeve.

SUMMARY OF THE INVENTION

In the above-disclosed seat reclining device, the wedge member receives a bending moment with the application of an external load to the seat back. In view of the fact that the protrusion of the wedge member makes line contact with the bearing sleeve at one point, it is likely that the wedge member will be tilted down under the bending moment to cause play in the seat back. Further, the protrusion of the wedge member is prone to wear by sliding contact with the bearing sleeve. The play of the seat back is more likely to occur when the protrusion is worn away so that the wedge member is inserted deeply between the outer circumferential surface of the bearing sleeve and the inner circumferential surface of the bearing bore.

Published Japanese Translation of PCT Application No. 2003-507101 proposes the use of a catch ring as a bearing for the wedge member in order to protect the wedge member from wear by sliding contact between the wedge member and the bearing sleeve. In this case, however, there arises a problem that dispersion in part dimensions increases with part count. In addition, the catch ring is so small in thickness that it is difficult to produce the catch ring of such small thickness accurately with sufficient strength.

It is therefore an object of the present invention to provide an automotive seat reclining device having a pair of wedge members to hold a seat back tightly at a desired angular position with respect to a seat cushion without causing play in the seat back due to tilting of the wedge members.

According to an aspect of the present invention, there is provided an automotive seat reclining device for holding a seat back at a desired angular position with respect to a seat cushion, comprising: a first rotation member connected to one of the seat back and the seat cushion and having an internal gear and a bearing sleeve coaxial with the internal gear; a second rotation member connected to the other of the seat back and the seat cushion and having an external gear in mesh with the internal gear and a bearing bore coaxial with the external gear to define a circular eccentric space between an outer circumferential surface of the bearing sleeve and an inner circumferential surface of the bearing bore, the internal gear being less in number of gear teeth than the external gear; a pair of wedge members disposed in the circular eccentric space with base ends thereof facing each other; a biasing member to bias the wedge members circumferentially away from each other; and a drive member inserted in the eccentric space to move the mesh of the internal gear and the external gear circumferentially by pushing the wedge members and thereby cause rotation of the second rotation member relative to the first rotation member at a reduction gear ratio in a direction opposite to a rotation direction of the mesh, wherein an outer circumferential surface of the each of the wedge members is formed into a circular arc of a single curvature radius slightly smaller than that of the inner circumferential surface of the bearing bore to make sliding contact with the inner circumferential surface of the bearing bore; and an inner circumferential surface of the each of the wedge members includes two circumferentially opposite circular arc sections formed into circular arcs of curvature radii larger than that of the outer circumferential surface of the bearing sleeve, a recessed section formed between the circular arc sections and two contact sections formed on circumferentially opposite sides of the recessed section to make contact with the outer circumferential surface of the bearing sleeve.

The other objects and features of the present invention will also become understood from the following description.

DESCRIPTION OF THE EMBODIMENTS

The present invention will be described in detail below by way of the following first and second embodiments, each of which refers to a seat reclining device for an automatic vehicle. It is noted that: in the first and second embodiments, like parts and portions are designated by like reference numerals to avoid repeated descriptions thereof; and the terms "front", "rear", "upper" and "lower" are used to describe various component parts of the seat reclining device as viewed by a vehicle passenger seated in a normal position.

The seat reclining device of the first embodiment has a seat back angle adjustment mechanism for holding a seat back at a desired angular position with respect to a seat cushion in the automotive vehicle. The seat back adjustment mechanism includes a first bracket connected with a lower end of the seat back, a second bracket connected with a rear end of the seat cushion and a differential gear unit disposed between the first and second brackets to adjust the angular position of the seat back with respect to the seat cushion.

Figure 4A:
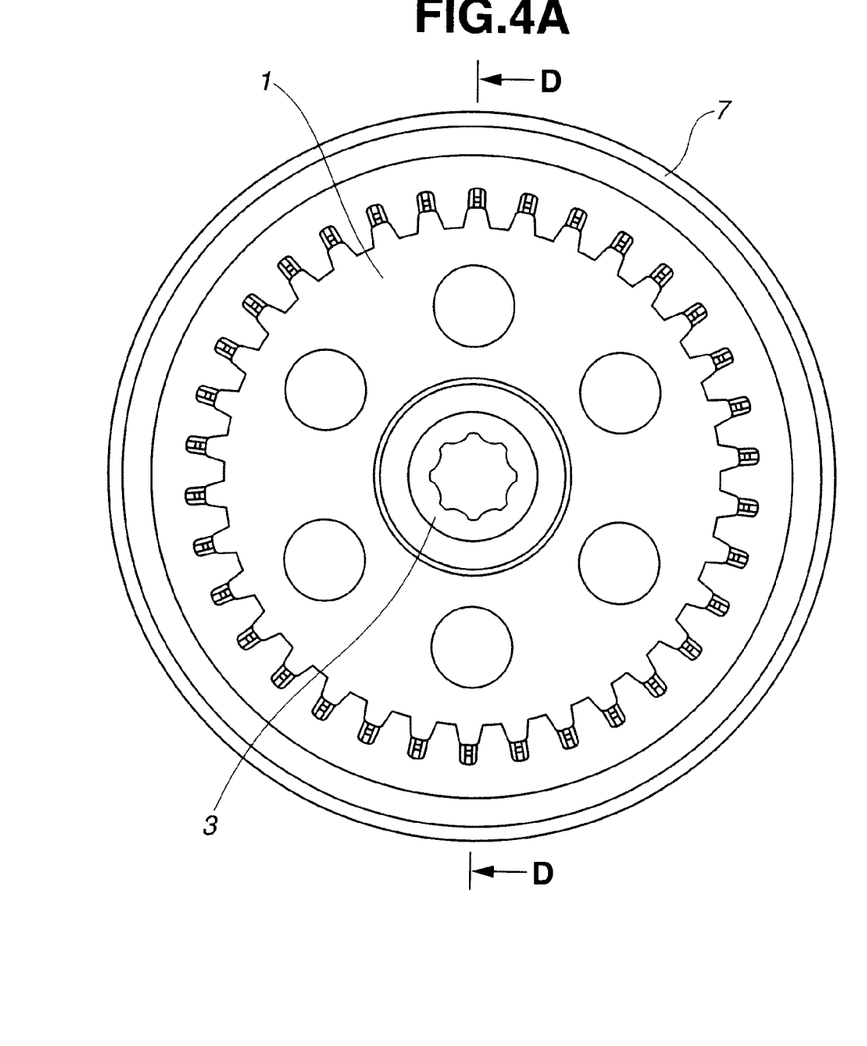
FIG. 4A is a side view of the seat reclining device according to the first embodiment of the present invention.
Figure 4B:
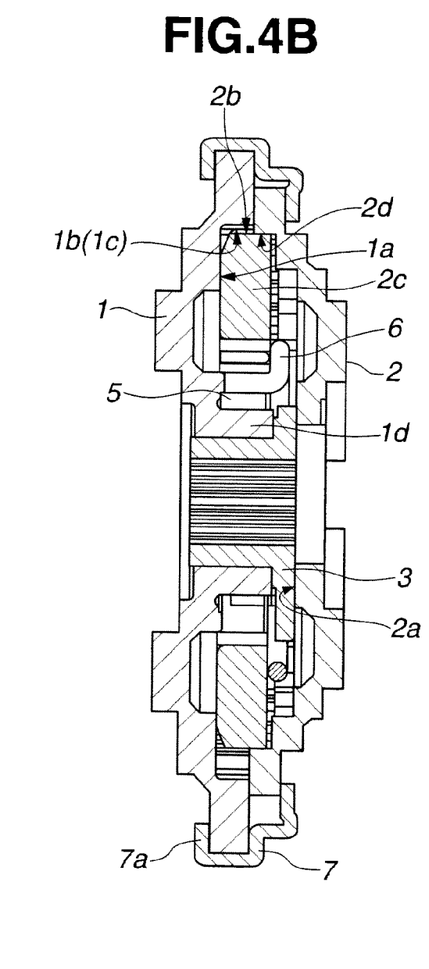
FIG. 4B is a section view of the seat reclining device taken along line D-D of FIG. 4A according to the first embodiment of the present invention.
Figure 5:
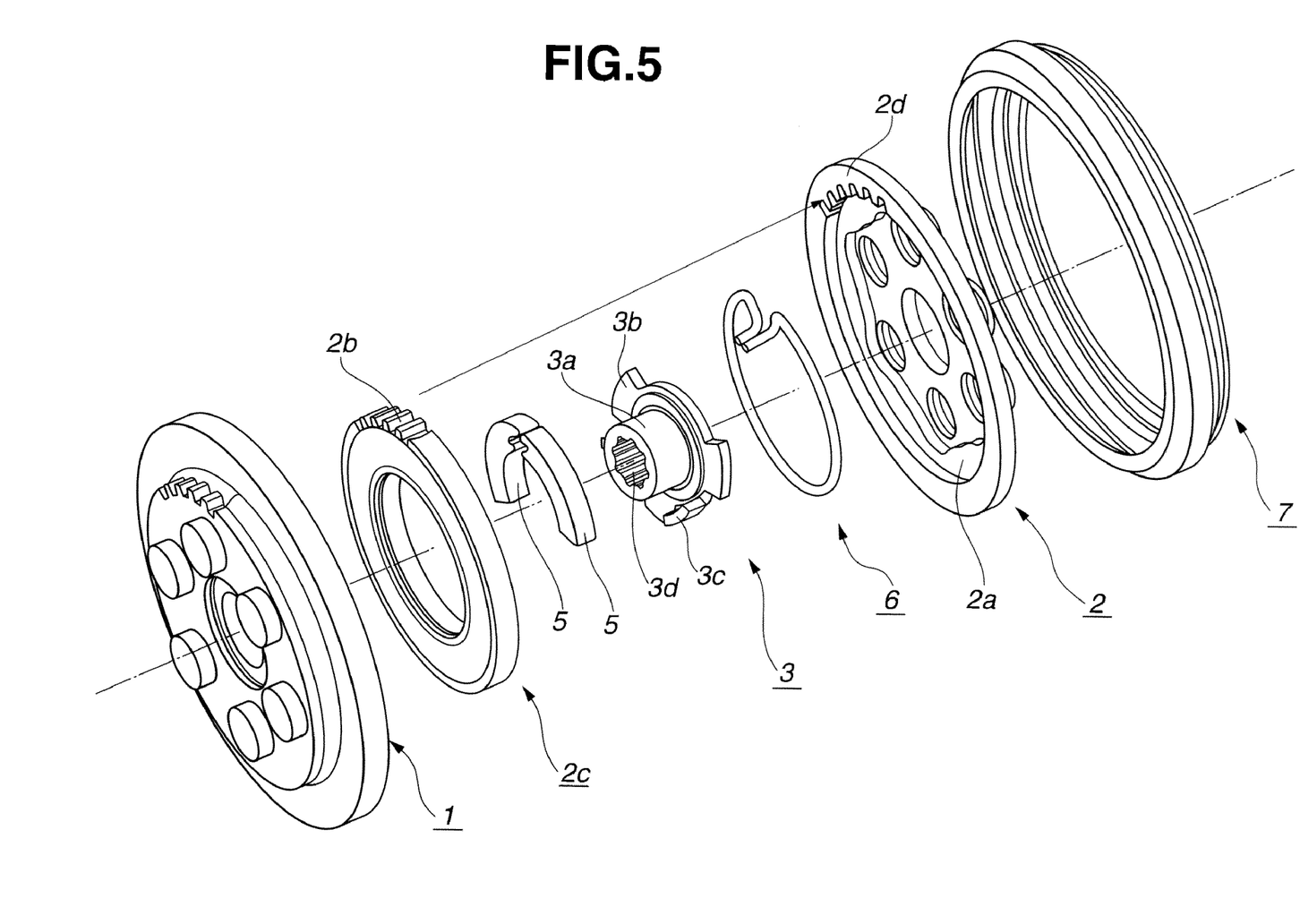
FIG. 5 is an exploded perspective view of the seat reclining device according to the first embodiment of the present invention.

As shown in 4A, 4B and 5, the differential gear unit includes a first rotation member 1, a second rotation member 2, a drive bushing 3 (as a drive member), a pair of wedge plates 5 (as wedge members) and a spring 6 (as a biasing member).

The first and second rotation members 1 and 2 are opposed to each other and coupled to the first and second brackets, respectively. A circular groove 1a is formed in a flat surface of the first rotation member 1 facing the second rotation member 2. An internal gear 1c is formed on the first rotation member 1 by forming internal gear teeth 1b in an inner circumferential wall of the circular groove 1a. Similarly, a circular groove 2a is formed in a flat surface of the second rotation member 2 facing the first rotation member 1. Internal gear teeth 2d are also intermittently formed in an inner circumferential wall of the circular groove 2a. An external gear 2c with external gear teeth 2b are formed on the second rotation member 2. In the first embodiment, the external gear teeth 2b are formed in an outer circumferential surface of the external gear 2c so that the external gear 2c is fitted in the circular groove 2a and thereby integrated into the second rotation member 2 as one component part. The external gear 2c meshes with both of the internal gear 1c (internal gear teeth 1b) and the internal gear teeth 2d in an axial direction (thickness direction) thereof.

Figure 3:
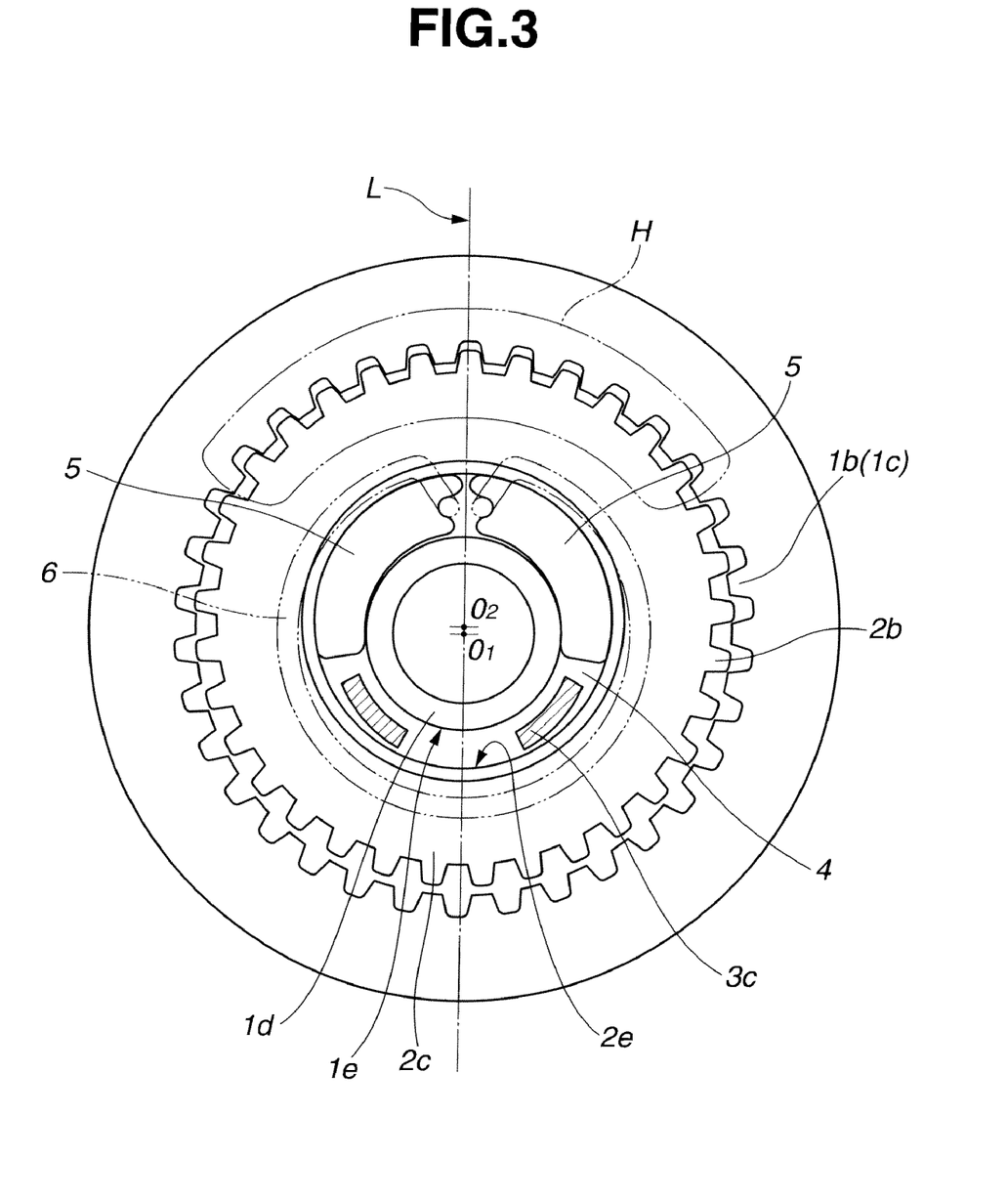
FIG. 3 is an internal schematic view of the seat reclining device according to the first embodiment of the present invention.

As shown in FIG. 3, the number of the internal gear teeth 1b and the number of the external gear teeth 2b are set to 34 and 33, respectively. In other words, the internal gear teeth 1b is one less in number than the external gear teeth 2b. By such a difference in gear teeth number, the center $O_1$ of the internal gear 1c and the center $O_2$ of the external gear 2c differ in position from each other in a state that some part of the external gear 2c (external gear teeth 2b) is held in mesh with the corresponding part of the internal gear 1c (internal gear teeth 1b). The mesh part between these gears 1c and 2c is hereinafter simply referred to as "mesh H".

As shown in FIGS. 3 and 4B, a bearing sleeve 1d is formed on the first rotation member 1. Further, a bearing bore is formed in the second rotation member 2 (external gear 2c). The bearing sleeve 1d has an outer circumferential surface 1e coaxial with the internal gear 1c, whereas the bearing bore has an inner circumferential surface 2e coaxial with the external gear 2c. The inner circumferential surface 2e of the external gear 2c and the outer circumferential surface 1e of the bearing sleeve 1d are located eccentrically to define a circular eccentric space 4 between the outer circumferential surface 1e of the bearing sleeve 1d and the inner circumferential surface 2e of the external gear 2c.

Figure 1:
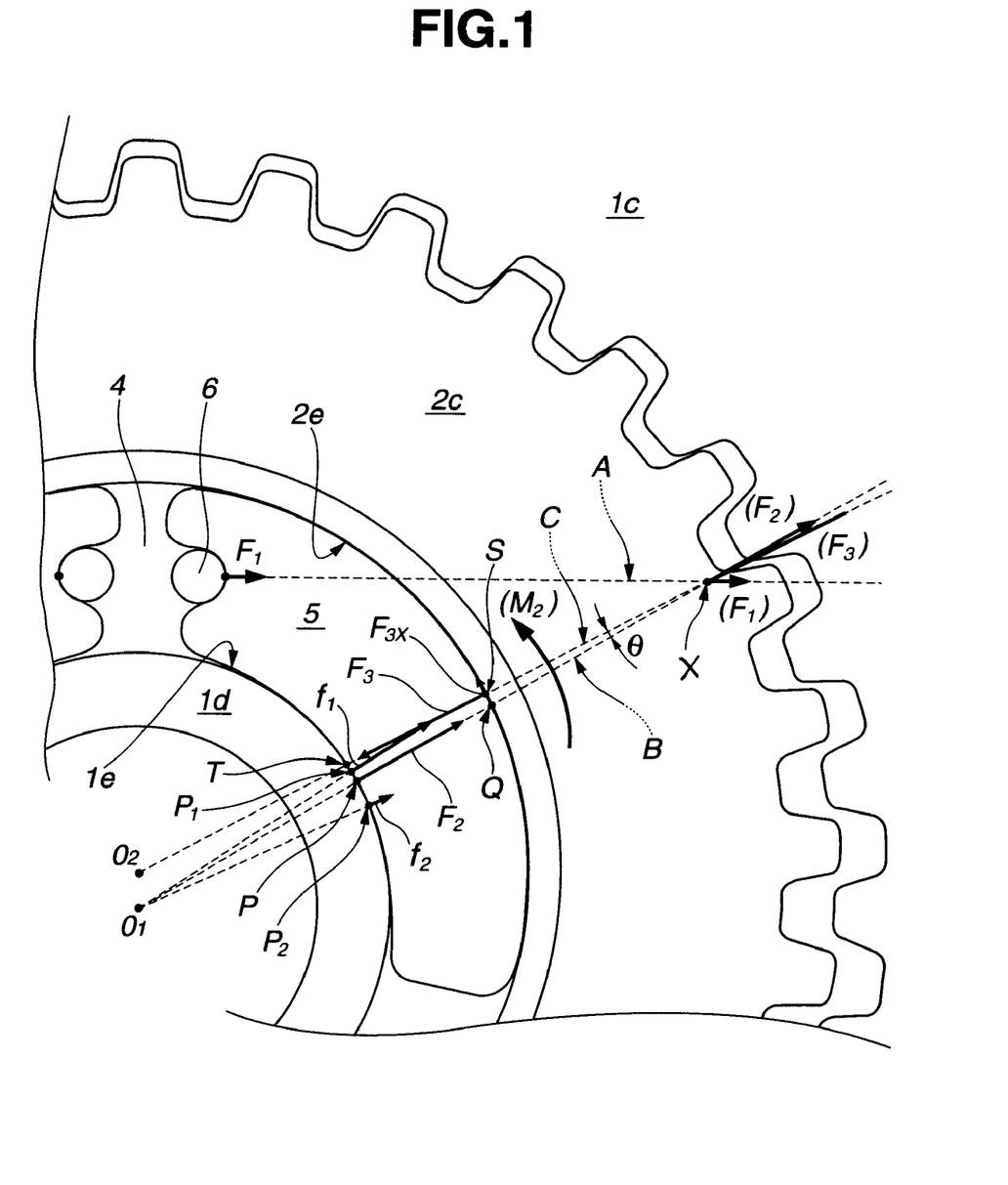
FIG. 1 is an enlarged schematic view of substantial part of an automotive seat reclining device according to a first embodiment of the present invention.
Figure 2:
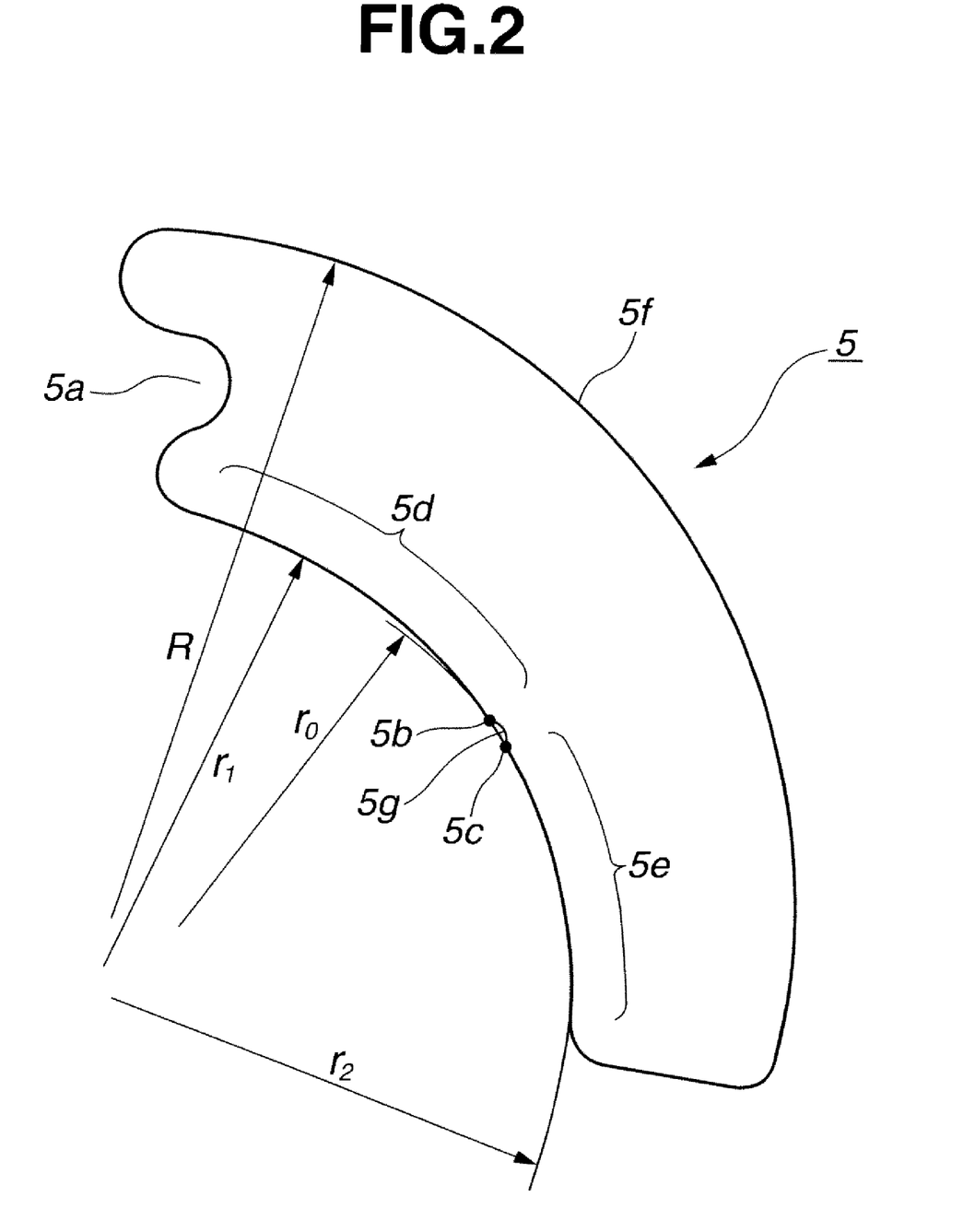
FIG. 2 is a plan view of a wedge member of the seat reclining device according to the first embodiment of the present invention.

The wedge plates 5 are circumferentially movably disposed in the eccentric space 4 so as to hold the internal gear 1c and the external gear 2c in mesh with each other and prevent the occurrence of backlash in the mesh H of the internal gear 1c and the external gear 2c due to dispersion in part dimensions more effectively than a single wedge member. As shown in FIGS. 3 and 5, the wedge plates 5 are arranged symmetrically with base ends thereof facing each other. Each of the wedge plates 5 has a shape to fit with a part of an arc of the eccentric space 4 as shown in FIGS. 1 to 3. Each of the wedge plates 5 also has a thickness substantially equal to the thickness of the external gear 2c and a width (radial dimension) gradually increasing toward the base end. Recesses 5a are formed in the base ends of the wedge plates 5, respectively.

The spring 6 has its both ends disposed in the eccentric space 4 and engaged in the recesses 5a of the wedge plates 5, so as to bias the wedge plates 5 circumferentially away from each other in the opposite directions.

Under the biasing force of the spring 6, the wedge plates 5 are inserted between the outer circumferential surface 1e of the bearing sleeve 1d and the inner circumferential surface 2e of the external gear 2c to exert a wedge effect for enlarging the eccentric space 4 and pushing the external gear 2c against the internal gear 1c so that the external gear 2c deeply meshes with the internal gear 1c with no (or little) backlash in the gear mesh H. This allows the external gear 2c and the wedge plates 5 to be held together between the internal gear 1c and the bearing sleeve 1d without play.

The drive bushing 3 is coupled to a motor, which is fixed to the seat back, via an input shaft. As shown in FIG. 5, the drive bushing 3 has a cylindrical part 3a inserted in the bearing sleeve 1d, a flange part 3b formed integral with the cylindrical part 3a so as to prevent the wedge plates 5 from falling axially out of the eccentric space 4 and a pair of push parts 3c formed on the flange part 3b so as to protrude axially from the flange part 3b into the eccentric space 4. As indicated by diagonal line hatching in FIG. 3, the push parts 3c are located adjacent to narrow tip ends of the wedge plates 5, respectively. Further, a plurality of axial spline grooves 3d are formed on an inner circumferential surface of the cylindrical part 3a so that the input shaft is engaged in the grooves 3a to transmit a rotational force of the motor to the drive bushing 3.

After assembling the first and second rotation members 1 and 2 with the drive bushing 3, the wedge plates 5 and the spring 6, the first and second rotation members 1 and 2 are held together by a connection ring 7. As shown in FIG. 4B, the connection ring 7 has a clamp portion 7a to prevent relative axial movement between the first and second rotation members 1 and 2 but allow relative rotation of the first and second rotation members 1 and 2.

When the above-structured seat reclining device is in an operating state, the drive bushing 3 is driven (rotated) by the motor to push either one of the push parts 3c against the tip end of the corresponding one of the wedge plates 5 toward the base end side. The spring 6 is then compressed slightly to push the other of the wedge plates 5 by the amount of compression of the spring 6. The wedge plates 5 are thus moved circumferentially in the eccentric space 4 without generating any gaps between the component parts. The circumferential movement of the wedge plates 5 causes a pivot of the center $O_2$ of the external gear 2c about the center $O_1$ of the internal gear 1c, thereby enabling the gear mesh H of the internal gear 1c and the external gear 2c on the side of the wedge plates 5. In other words, the gear mesh H is moved circumferentially together with the wedge plates 5 by the drive bushing 3. As the external gear 2c shifts relative to the internal gear 1c by one gear tooth per one circumferential turn (rotation) of the gear mesh H, the second rotation member 2 rotates relative to the first rotation member 1 at a high reduction gear ratio in the direction opposite to the rotation direction of the gear mesh H (drive bushing 3) to thereby adjust the angular position of the seat back with respect to the seat cushion.

When the seat reclining device is in a locked state, by contrast, the drive bushing 3 is stopped. The first and second rotation members 1 are locked in position by the gear mesh H of the internal gear 1c and the external gear 2c to hold the seat back at the given angular position with respect to the seat cushion.

Figure 9:
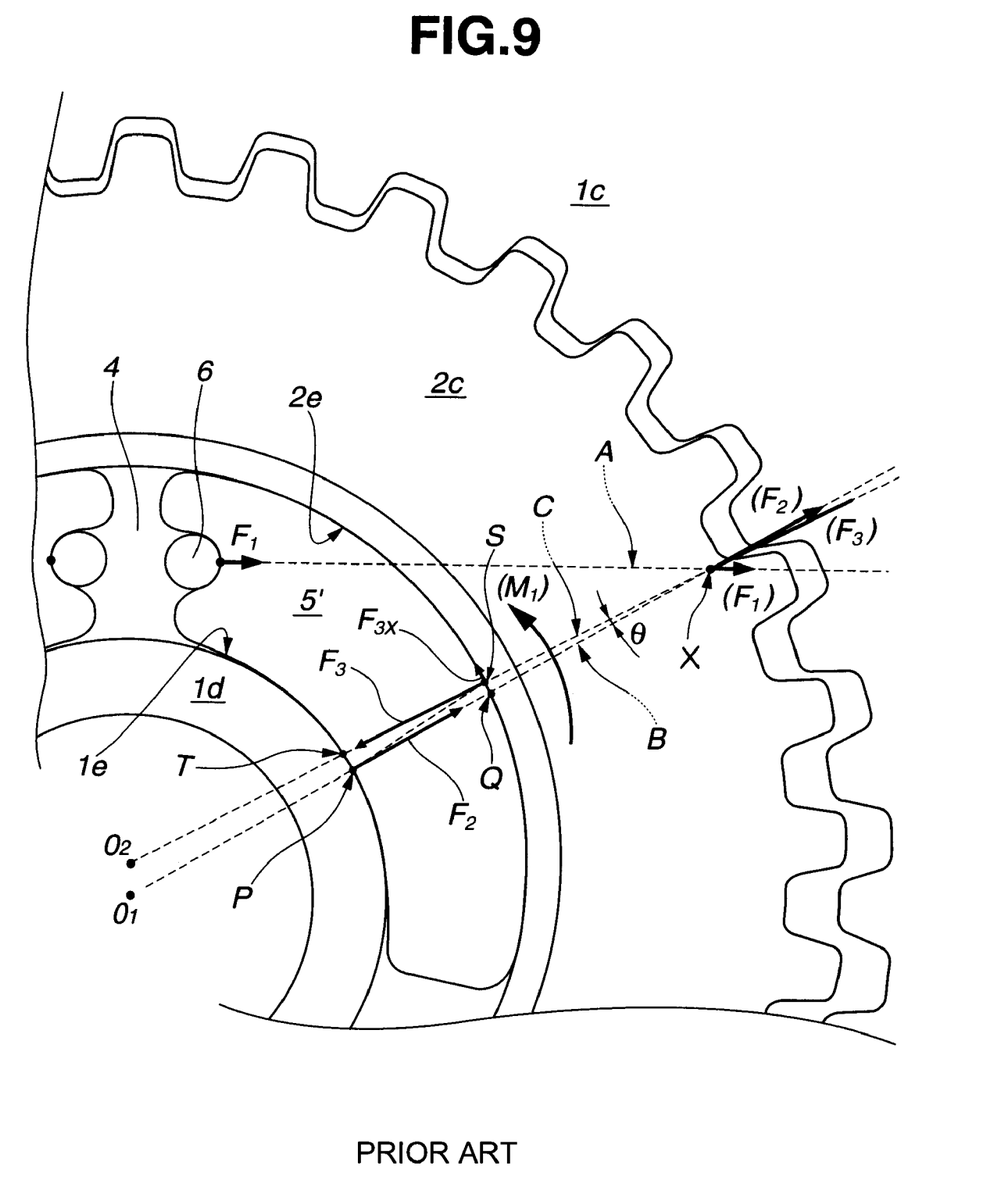
FIG. 9 is an enlarged schematic view of substantial part of a conventional automotive seat reclining device.

As shown in FIG. 9, a wedge plate 5' of a conventional seat reclining device has an inner circumferential surface formed with two circular arc sections to make line contact with the outer peripheral surface 1e of the bearing sleeve 1d in the thickness direction at one point P between these two circular arc sections as already mentioned before. The one-point contact of the wedge plate 5' and the bearing sleeve 1d is for the purpose of stabilizing the after-defined wedge angle θ by fixing the contact point P. The wedge plate 5' also has an outer circumferential surface to make line contact with the inner peripheral surface 2e of the external gear 2c in the thickness direction at a point S.

In a locked state of the conventional seat reclining device (where the drive bushing 3 is stopped), three external forces (loads) acts on the wedge plate 5' as indicated by arrows $F_1$, $F_2$ and $F_3$ in FIG. 9. For purposes of illustration, the lengths of the arrows are not in proportion to the magnitudes of the loads in FIG. 9. The load $F_1$ is the biasing force applied by the spring 6 to the wedge plate 5' along the line A of action. The load $F_2$ is applied from the bearing sleeve 1d to the wedge plate 5' via the contact point P as an external force is exerted on the seat back in a direction that tilts down the seat back under the weight of the seat back or by the passenger's seat reclining action. The line B of action of the load $F_2$ is orthogonal to the inner peripheral surface of the wedge plate 5' and passes through the center $O_1$ of the internal gear 1c and the contact point P between the bearing sleeve 1d and the wedge plate 5'. The load $F_3$ is applied, as a reaction force to the load $F_2$, by the external gear 2c to the wedge plate 5' via the contact point S. The line C of action of the load $F_3$ is orthogonal to the outer peripheral surface of the wedge plate 5' and passes through the center $O_2$ of the external gear 2c, the contact point S between the external gear 2c and the wedge plate 5' and the intersection X of the lines A and B of action of the loads $F_1$ and $F_2$. The loads $F_1$ and $F_2$ act on the point R radially outwardly, whereas the load $F_3$ acts on the point R radially inwardly and balances with the resultant of the radially outward loads $F_1$ and $F_2$. In other words, the three loads $F_1$, $F_2$ and $F_3$ on the wedge plate 5' balance with one another at the point R.

The offset angle θ between the line B of action of the load $F_2$ and the line C of action of the load $F_3$ is herein defined as a "wedge angle", which corresponds to the angle which a tangent to the inner circumferential surface 1e of the bearing sleeve 1d at the point P forms with a tangent to the outer circumferential surface 2e of the external gear 2c at the point S. In general, the wedge angle θ decreases as the position of the intersection X becomes shifted toward the wedge plate 5' (toward the left in FIG. 9) along the line A of action of the load $F_1$ and increases as the position of the intersection X becomes shifted away from the wedge plate 5' (toward the right in FIG. 9) along the line A of action of the load $F_1$.

It is conceivable to shift the intersection X toward the wedge plate 5' (toward the left in FIG. 9) by displacing the contact points P and S toward the base end side of the wedge plate 5' (in the counterclockwise direction in FIG. 9). For example, when the contact point P of the wedge plate 5' and the bearing sleeve 1d is displaced toward a point T on the line C of action of the load $F_3$, the wedge plate 5' pushes the inner circumferential surface 2e of the external gear 2c under the load $F_2$ and moves slightly relative to the inner circumferential surface 2e of the external gear 2c toward the base end side so that the contact point S of the wedge plate 5' and the external gear 2c is displaced toward the base end side of the wedge plate 5'. The intersection X becomes thus shifted toward the wedge plate 5' (toward the left in FIG. 9) along the line A of action of the force $F_1$ as the contact points P and S are displaced toward the base end side of the wedge plate 5' (in the counterclockwise direction in FIG. 9).

In the presence of the wedge angle θ, component forces of the loads $F_2$ and $F_3$ are exerted on the contact points P and S, respectively, in the direction that pushes the wedge plate 5' toward the base end side and thereby moves the wedge plate 5' out from between the outer peripheral surface 1e of the bearing sleeve 1d and the inner peripheral surface 2e of the external gear 2c. In order for the wedge plate 5' not to be moved out from between the bearing sleeve 1d and the external gear 2c under the loads $F_2$ and $F_3$, the wedge angle θ is established in such a manner that these component forces of the loads $F_2$ and $F_3$ are smaller than the frictional forces between the inner circumferential surface of the wedge plate 5' and the outer peripheral surface 1e of the bearing sleeve 1d and between the outer peripheral surface of the wedge plate 5' and the inner peripheral surface 2e of the external gear 2c.

Figure 8:
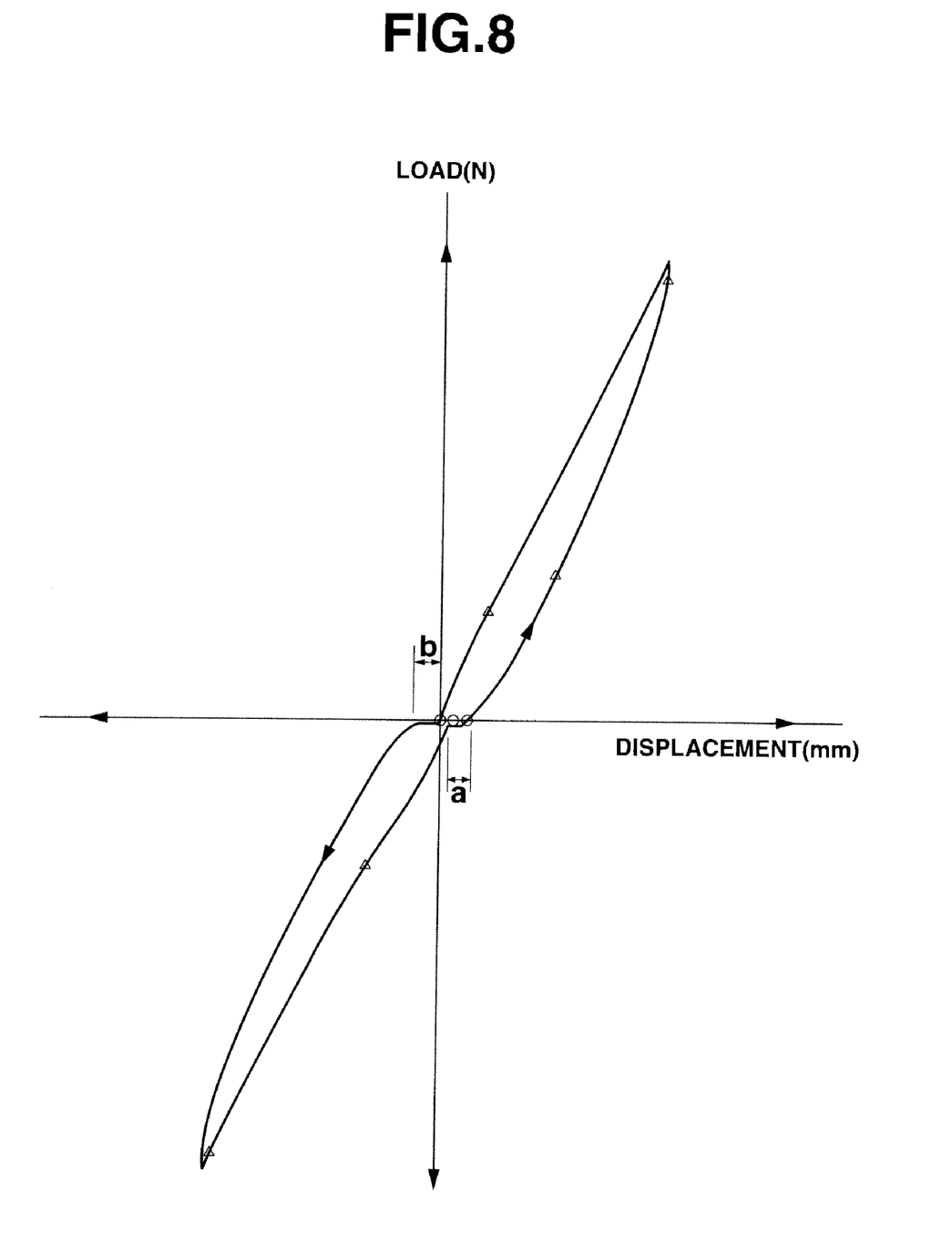
FIG. 8 is a graph showing a relationship between seat back load and seat back displacement in a conventional seat reclining device.

Further, a component force $F_{3x}$ of the load $F_3$ is exerted in the direction perpendicular to a line passing through the contact points P and S in the presence of the wedge angle θ. This component force $F_{3x}$ acts as a bending moment $M_1$ that tilts the wedge plate 5' slightly about the contact point P in the direction toward the base end side (swings the wedge plate 5' slightly within the space between the outer circumferential surface 1e of the bearing sleeve 1d and the inner circumferential surface 2e of the external gear 2c). The bending moment $M_1$ becomes large as the loads $F_2$ and $F_3$ increase with the external force on the seat back. Upon receipt of such a large bending moment $M_1$, the wedge plate 5' is tilted down to cause the external gear 2c to rotate the internal gear 1c together with the seat back in response to the tilting of the wedge plate 5'. Even the slight tilt of the wedge plate 5' results in large play of the upper side of the seat back. In consequence, the conventional seat reclining device causes a displacement in the seat back by the amount of "a" or "b" soon after the application of the external force to the seat back as shown in FIG. 8 regardless of the direction of the external force on the seat back.

The frictional resistance between the wedge plate 5' and the bearing sleeve 1d and between the wedge plate 5' and the external gear 2b increases with decrease in the wedge angle θ Moreover, the component force $F_{3x}$ of the load $F_3$ i.e. the bending moment $M_1$ decreases with the wedge angle θ. The wedge plate 5' can be thus held firmly between the bearing sleeve 1d and the external gear 2b and prevented from being tilted without causing play in the seat back when the wedge angle θ is small. When the wedge angle θ is too small, however, the frictional resistance between the wedge plate 5' and the bearing sleeve 1d and between the wedge plate 5' and the external gear 2b becomes so high that the wedge plate 5' cannot be easily moved out from between the bearing sleeve 1d and the external gear 2c even at the time the seat reclining device shifts into an operating state to drive the drive bushing 3 and move the wedge plate 5'.

It is accordingly necessary to establish the wedge angle θ so as to not only prevent the wedge plate 5' from being tilted by the bending moment $M_1$ and reduce or eliminate play (displacement) in the seat back but secure the operability of the wedge plate 5' (the balance between the ease of moving the wedge plate 5' under the operating state and the difficulty of moving the wedge plate 5' under the locked state).

In view of the foregoing, each of the wedge plates 5 has an inner circumferential surface formed with two separate contact sections 5b and 5c to make sliding line contact with the outer circumferential surface 1e of the bearing sleeve 1d at two points $P_1$ and $P_2$ as shown in FIGS. 1 and 2 in the first embodiment.

More specifically, the circumferential surface of the wedge plate 5 is formed with reference to a circular arc of curvature radius $r_0$ about the center $O_1$ of the internal gear 1c (bearing sleeve 1d), including two relief sections 5d and 5e on circumferentially opposite sides of the wedge plate 5 and a recessed section 5g between the relief sections 5d and 5e as shown in FIG. 2.

The relief sections 5d and 5e are formed into circular arcs of curvature radii $r_1$ and $r_2$, with the centers of these circular arcs differing in position from the center $O_1$ of the internal gear 1c (bearing sleeve 1d). The curvature radii $r_1$ and $r_2$ are larger than the curvature radius of the outer circumferential surface 1e of the bearing sleeve 1d so as to leave slight clearances between the relief section 5d and the outer circumferential surface 1e of the bearing sleeve 1d and between the relief section 5e and the outer circumferential surface 1e of the bearing sleeve 1d.

The recessed section 5g is in actual a slight recess of about several hundredths of a millimeter although exaggerated in FIG. 2 for purposes of illustration.

By the formation of the recessed section 5g between the relief sections 5d and 5e, the contact sections 5b and 5c are defined on circumferentially opposite sides of the recessed section 5g (more specifically, between the relief section 5d and the recessed section 5g and between the relief section 5e and the recessed section 5g) so as to secure two adjacent contact points $P_1$ and $P_2$ for sliding line contact with the outer circumferential surface 1e of the bearing sleeve 1d.

On the other hand, each of the wedge plates 5 has an outer circumferential surface 5f formed into a circular arc of a single curvature radius R. In view of dispersion in part dimensions, the curvature radius R is made substantially equal to and slightly smaller than the curvature radius of the inner circumferential surface 2e of the external gear 2c so that the outer circumferential surface 5f of the wedge plate 5 makes sliding line contact with the inner circumferential surface 2e of the external gear 2c at one point S.

These two wedge plates 5 are held within the eccentric space 4 under the biasing force of the spring 6 and inserted in between the outer circumferential surface 1e of the bearing sleeve 1d and the inner circumferential surface 2e of the external gear 2c, with the opposite base and tip ends of the wedge plates 5 slightly apart from the outer circumferential surface 1e of the bearing sleeve 1d and the inner circumferential surface 2e of the external gear 2c although not so shown in the drawings.

If the inner circumferential surface and outer circumferential surface 5f of the wedge plate 5 are in the same forms as those of the outer circumferential surface 1e of the bearing sleeve 1d and the inner circumferential surface 2e of the external gear 2c, respectively, the wedge plate 5 is held by the bearing sleeve 1d and the external gear 2c at any position between the opposite tip and base ends. As the radial width and wedge angle θ of the wedge plate 5 vary depending on the circumferential position of the wedge plate 5, the operability of the wedge plate 5 (the ease or difficulty of moving the wedge plate 5) depends on the position of the wedge plate 5 held by the bearing sleeve 1d and the external gear 2c and does not become stable and constant. In order to compensate such performance dispersion, the wedge plate 5 needs to be allowed to tilt toward either one of the outer circumferential surface 1e of the bearing sleeve 1d and the inner circumferential surface 2e of the external gear 2c.

In the first embodiment, however, the relief sections 5d and 5e are formed on the circumferentially opposite sides of the inner circumferential surface of the wedge plate 5 so as to sandwich therebetween the contact sections 5b and 5c as mentioned above. The wedge plate 5 can be thus held at a fixed position, whereby both of the contact sections 5b and 5c come into contact with the outer circumferential surface 1e of the bearing sleeve 1d irrespective of the change in eccentricity of the eccentric space 4 and the position of the wedge plate 5 within the eccentric space 4.

In the locked state of the seat reclining device (where the drive bushing 3 is stopped), three external forces (loads) acts on the wedge plate 5 as indicated by arrows $F_1$, $F_2$ and $F_3$ in FIG. 1 as in the above-explained conventional case. The lengths of the arrows are not also in proportion to the magnitudes of the loads in FIG. 1 for purposes of illustration. The load $F_1$ is the biasing force applied by the spring 6 to the wedge plate 5 along the line A of action. The load $F_2$ is the resultant of component forces $f_1$ and $f_2$ applied by the bearing sleeve 1d to the wedge plate 5 via the respective contact points $P_1$ and $P_2$. As the lines of action of the component forces $f_1$ and $f_2$ pass through the center $O_1$ of the internal gear 1c and the first contact point $P_1$ and through the center $O_1$ of the internal gear 1c and the second contact point $P_2$, respectively, the line B of action of the load $F_2$ passes through the center $O_1$ of the internal gear 1c and a point P between the contact points $P_1$ and $P_2$ on the inner circumferential surface of the wedge plate 5. The load $F_3$ is applied, as a reaction force to the load $F_2$, by the external gear 2c to the wedge plate 5 via the contact point S. The line C of action of the load $F_3$ passes through the center $O_2$ of the external gear 2c, the contact point S between the external gear 2c and the wedge plate 5 and the intersection X of the lines A and B of action of the loads $F_1$ and $F_2$. These three loads $F_1$, $F_2$ and $F_3$ balance with one another at the intersection R of the lines A, B and C of action of the loads $F_1$, $F_2$ and $F_3$.

The point P on the inner circumferential surface of the wedge member 5 through which the line B of action of the load $F_2$ passes is herein defined as a "reference point". It means that the contact point $P_1$ is located on the base end side of the wedge plate 5 with respect to the reference point P, whereas the contact point $P_2$ is located on the tip end side of the wedge plate 5 with respect to the reference point P. As the reference point P of the wedge plate 5 is in agreement with the contact point P of the conventional wedge plate 5', the wedge angle θ remains the same in the wedge plate 5 and the conventional wedge plate 5'. By determining the reference point P for the established wedge angle θ, the line B of action of the load $F_2$ (passing through the center $O_1$ of the internal gear 1c and the reference point P), the intersection X of the lines A and B of action of the loads $F_1$ and $F_2$, the line C of action of the load $F_3$ (passing through the center $O_2$ of the external gear 2c and the intersection X) and the contact section S (located on the line C of action of the load $F_3$) are determined naturally.

In the first embodiment, the wedge plate 5 is in particular characterized in that the contact point $P_1$ is located between the reference point P on the line B of action of the force $F_2$ and the point T on the line C of action of the force $F_3$ whereas the contact point $P_2$ is located on the tip end side of the wedge plate 5 with respect to the line C of action of the load $F_3$.

With this location, the force $f_1$ is exerted on the contact section 5b via the contact point $P_1$ in the direction that the wedge plate 5 turns slightly relative to the inner circumferential surface 2e of the external gear 2c so as to tilt the tip end side of the wedge plate 5 radially inwardly and to displace the contact point S toward the base end side of the wedge plate 5. However, the contact section 5c contacts with the outer circumferential surface 1e of the bearing sleeve 1d at the contact point $P_2$ so as to prevent the wedge plate 5 from being tilted and maintain the contact point S in position. Although a component force $F_{3x}$ of the load $F_3$ in the direction perpendicular to a line passing through the contact points $P_1$ and S acts as a bending moment $M_2$, the magnitude of the component force $F_{3x}$ (bending moment $M_2$) is reduced by the amount of deviation from the point P to the point $P_1$. Under such a smaller bending moment $M_2$ decreases, the wedge plate 5 is less likely to tilt about the point $P_1$ even when the both of the load $F_2$ (the resultant of the component forces $f_1$ and $f_2$) and the load $F_3$ increase with the external load on the seat back.

Furthermore, the two-point contact of the wedge plate 5 and the bearing sleeve 1d allows a reduction of the load on each contact section 5b, 5c (the pressure on the inner circumferential surface of the wedge plate 5) so as to protect the contact section 5b, 5c from wear and to ease the difficulty of moving the wedge plate 5. The two-point contact of the wedge plate 5 and the bearing sleeve 1d also stabilizes the attitude of the wedge plate 5 so as to move the wedge plate 5 circumferentially without swinging. The durability and operability of the wedge plate 5 can be thus improved efficiently.

Figure 7:
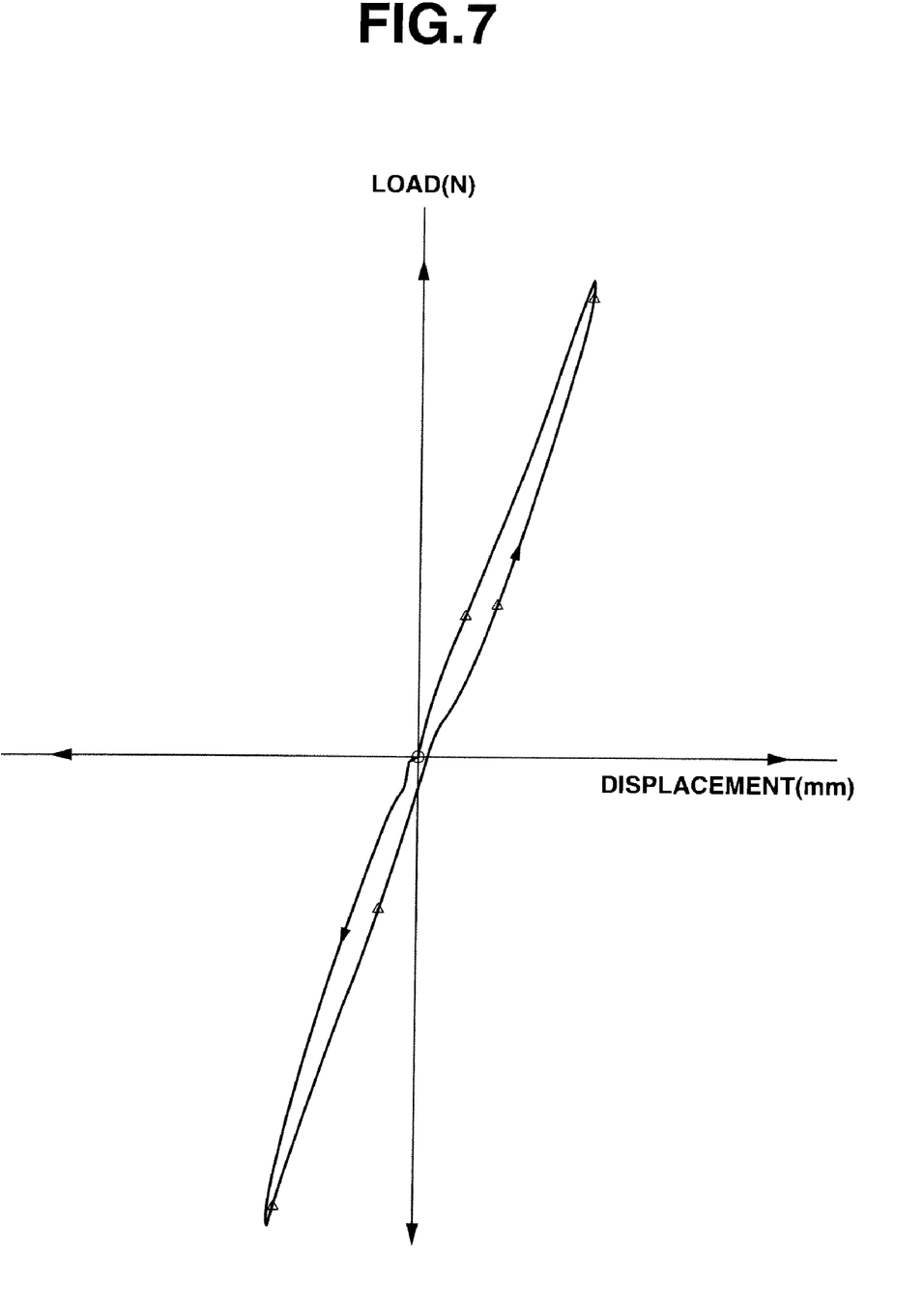
FIG. 7 is a graph showing a relationship between seat back load and seat back displacement in the seat reclining device according to the first embodiment of the present invention.

As described above, the wedge plate 5 is stably supported at three points in total, i.e., two contact points $P_1$ and $P_2$ on the inner circumferential surface and one contact point S on the outer circumferential surface 5f. It is therefore possible in the first embodiment to decrease the bending moment $M_1$ on the wedge plate 5, prevent the wedge plate 5 from being tilted and then reduce or eliminate play (displacement) in the seat back as shown in FIG. 7. As there is no change of the wedge angle θ between the wedge plate 5 of the first embodiment and the conventional wedge plate 5', the operability of the wedge plate 5 can be maintained without deterioration.

Although the contact point $P_1$ is located between the lines B and C of action of the loads $F_2$ and $F_3$ in the first embodiment, the contact point $P_1$ may alternatively be located in such a manner that the line of action of the force $f_1$ on the contact point $P_1$ extends through the contact point S or on the slightly tip end side of the contact point S. This allows the wedge plate 5 to be easily moved by the drive bush 3 for improvement in operability.

Figure 6:
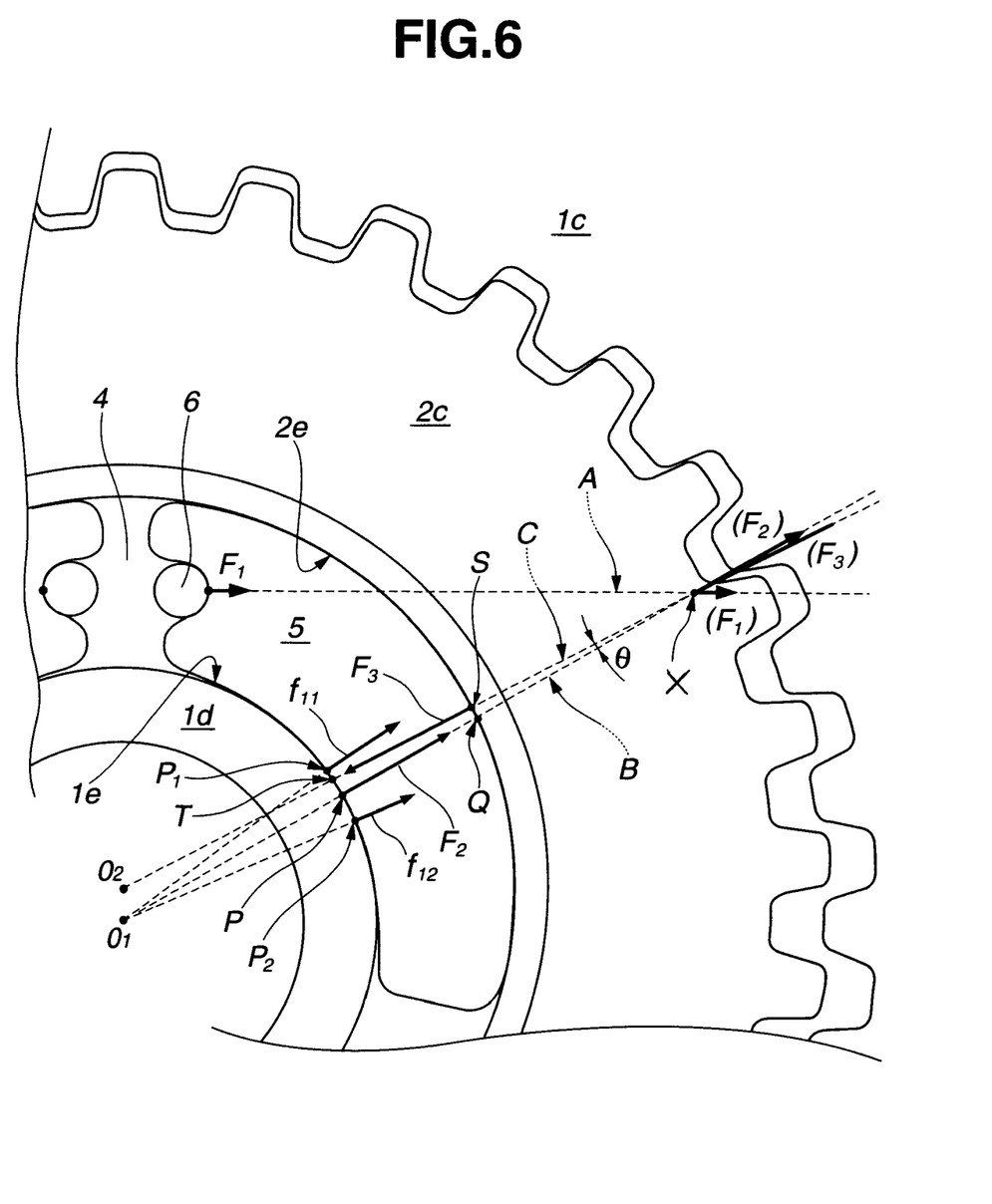
FIG. 6 is an enlarged schematic view of substantial part of an automotive seat reclining device according to a second embodiment of the present invention.

The seat reclining device of the second embodiment is structurally similar to that of the first embodiment, except for the location of the contact point $P_1$ on the contact section 5b of the wedge plate 5 as shown in FIG. 6.

The wedge plate 5 is supported at three points in total, i.e., two contact points $P_1$ and $P_2$ on the inner circumferential surface and one contact point S on the outer circumferential surface 5f.

In the second embodiment, the wedge plate 5 is characterized in that the contact point $P_1$ is located on the base end side of the wedge plate 5 with respect to the line C of action of the load $F_3$ whereas the contact point $P_2$ is located on the tip end side of the wedge plate 5 with respect to not only the line B of action of the load $F_2$ but also the line C of action of the load $F_3$.

In the locked state of the seat reclining device (where the drive bushing 3 is stopped), three external forces (loads) acts on the wedge plate 5 as indicated by arrows $F_1$, $F_2$ and $F_3$ in FIG. 6. The load $F_1$ is the biasing force applied by the spring 6 to the wedge plate 5 along the line A of action. The load $F_2$ is the resultant of component forces $f_{11}$ and $f_{12}$ applied by the bearing sleeve 1d to the wedge plate 5 via the respective contact points $P_1$ and $P_2$. As defined above, the line B of action of the load $F_2$ passes through the reference point P. The load $F_3$ is applied by the external gear 2c to the wedge plate 5 via the contact point S. The line C of action of the load $F_3$ extends between the contact point $P_1$ and the reference point P.

As the load $F_3$ is exerted in the direction between the contact points $P_1$ and $P_2$, the load $F_3$ develops no component force that acts as a bending moment to tilt the wedge plate 5. It is therefore possible to prevent the wedge plate 5 from being tilted and reduce or eliminate play in the seat back in the second embodiment. The operability of the wedge plate can be maintained without deterioration as there is no change of the wedge angle θ between the wedge plate 5 of the second embodiment and the conventional wedge plate 5'. Further, the two-point contact of the wedge plate 5 and the bearing sleeve 1d allows a reduction of the load on each contact section 5b, 5c (the pressure on the inner circumferential surface of the wedge plate 5) so as to protect the contact section 5b, 5c from wear and to ease the difficulty of moving the wedge plate 5. The two-point contact of the wedge plate 5 and the bearing sleeve 1d also stabilizes the attitude of the wedge plate 5 so as to move the wedge plate 5 circumferentially without swinging. The durability and operability of the wedge plate 5 can be thus improved efficiently.

The entire contents of Japanese Patent Application No. 2008-054204 (filed on Mar. 5, 2008) are herein incorporated by reference.

Although the present invention has been described with reference to the above specific embodiments, the invention is not limited to these exemplary embodiments. Various modification and variation of the embodiments described above will occur to those skilled in the art in light of the above teachings. For example, the first and second rotation members 1 and 2 can be connected to the seat cushion and the seat back via the brackets, respectively, although the first and second rotation members 1 and 2 are connected to the seat back and the seat cushion via the brackets in the above first and second embodiments. Further, the wedge plates 5 may be modified by e.g. extending the base ends of the wedge plates 5 along the arc of the eccentric space 4 so that the wedge plates 5 are axially laminated together within the eccentric space 4. The scope of the invention is defined with reference to the following claims.

What is claimed is:

1. An automotive seat reclining device for holding a seat back at a desired angular position with respect to a seat cushion, comprising:

a first rotation member connected to one of the seat back and the seat cushion and having an internal gear and a bearing sleeve coaxial with the internal gear;

a second rotation member connected to the other of the seat back and the seat cushion and having an external gear in mesh with the internal gear and a bearing bore coaxial with the external gear to define a circular eccentric space between an outer circumferential surface of the bearing sleeve and an inner circumferential surface of the bearing bore, the internal gear being less in number of gear teeth than the external gear;

a pair of wedge members disposed in the circular eccentric space, each of the wedge members having opposite tip and base ends, the base end of one of the wedge members facing the base end of the other of the wedge members;

a biasing member to bias the wedge members circumferentially away from each other; and a drive member inserted in the circular eccentric space to move the mesh of the internal gear and the external gear circumferentially by pushing the wedge members and thereby cause rotation of the second rotation member relative to the first rotation member at a reduction gear ratio in a direction opposite to a rotation direction of the mesh, wherein an inner circumferential surface of said each of the wedge members includes two circumferentially opposite circular arc sections formed into circular arcs of curvature radii larger than that of the outer circumferential surface of the bearing sleeve, a recessed section formed between the circular arc sections and two contact sections formed on circumferentially opposite sides of the recessed section to secure adjacent first and second contact points that make contact with the outer circumferential surface of the bearing sleeve; an outer circumferential surface of said each of the wedge members is formed into a circular arc of a single curvature radius slightly smaller than that of the inner circumferential surface of the bearing bore to secure a third contact point that makes contact with the inner circumferential surface of the bearing bore; said each of the wedge members receives a force applied by the second rotation member via the third contact point along a line of action; said line of action passes through a center of the external gear and the third contact point; and the first and second contact points are located on a tip end side of the wedge member with respect to said line of action.

2. The automotive seat reclining device according to claim 1, wherein said each of the wedge members receives a force applied by the biasing member along a second line of action and a resultant of forces applied by the first rotation member via the respective first and second contact points along a third line of action; the first line of action passes through an intersection of the second and third lines of action; and the first contact point is located at a position between the first and third lines of action.

3. The automotive seat reclining device according to claim 2, wherein a line of action of a force exerted on the first contact point extends through the third contact point or on a slightly tip end side of the third contact point.

* * * * *